United States Patent [19]

Fukase et al.

[11] 4,159,293
[45] Jun. 26, 1979

[54] METHOD AND APPARATUS FOR CONTROLLING PARISON DIMENSIONS

[75] Inventors: Hisahiko Fukase; Akihiro Nomura; Sadahiko Shinya, all of Yokohama; Minoru Yoneda, Yamato; Riyuji Takahashi, Tokyo, all of Japan

[73] Assignees: Ishikawajima-Harima Ju-Kogyo K.K., Yokama; Kayaba Kogyoka K.K., Tokyo, both of Japan

[21] Appl. No.: 860,051

[22] Filed: Dec. 13, 1977

[30] Foreign Application Priority Data

Dec. 15, 1976 [JP] Japan .................... 51/149856

[51] Int. Cl.² ................................. B29F 3/00
[52] U.S. Cl. ......................... 264/40.5; 264/40.2; 264/40.7; 425/141; 425/150; 425/532
[58] Field of Search .............. 425/140, 141, 532, 150; 264/40.2, 40.5, 40.7

[56] References Cited

U.S. PATENT DOCUMENTS

| | | | |
|---|---|---|---|
| 3,538,548 | 11/1970 | Tenner | 425/111 |
| 3,712,772 | 1/1973 | Hunkar | 425/141 |
| 4,000,402 | 12/1976 | Higham | 425/141 |
| 4,011,493 | 3/1977 | Fukase et al. | 425/381 |

Primary Examiner—John McQuade
Attorney, Agent, or Firm—Saul Jecies

[57] ABSTRACT

A parison length controller for molding parisons having a predetermined length and a uniform wall thickness distribution over the whole length. A parison lower edge detector is provided for generating the parison lower edge signal when a parison is extruded to a predetermined length, and a parison controller generates the extrusion end signal every time when an extrusion plunger reaches the end of the extrusion stroke. Depending upon whether the parison lower edge signal or the extrusion end signal occurs first, a positive or negative voltage signal of a predetermined magnitude is generated, and the positive and negative voltage signals are accumulated and stored and used as a wall thickness correction signal for forming a parison having a predetermined length.

11 Claims, 8 Drawing Figures

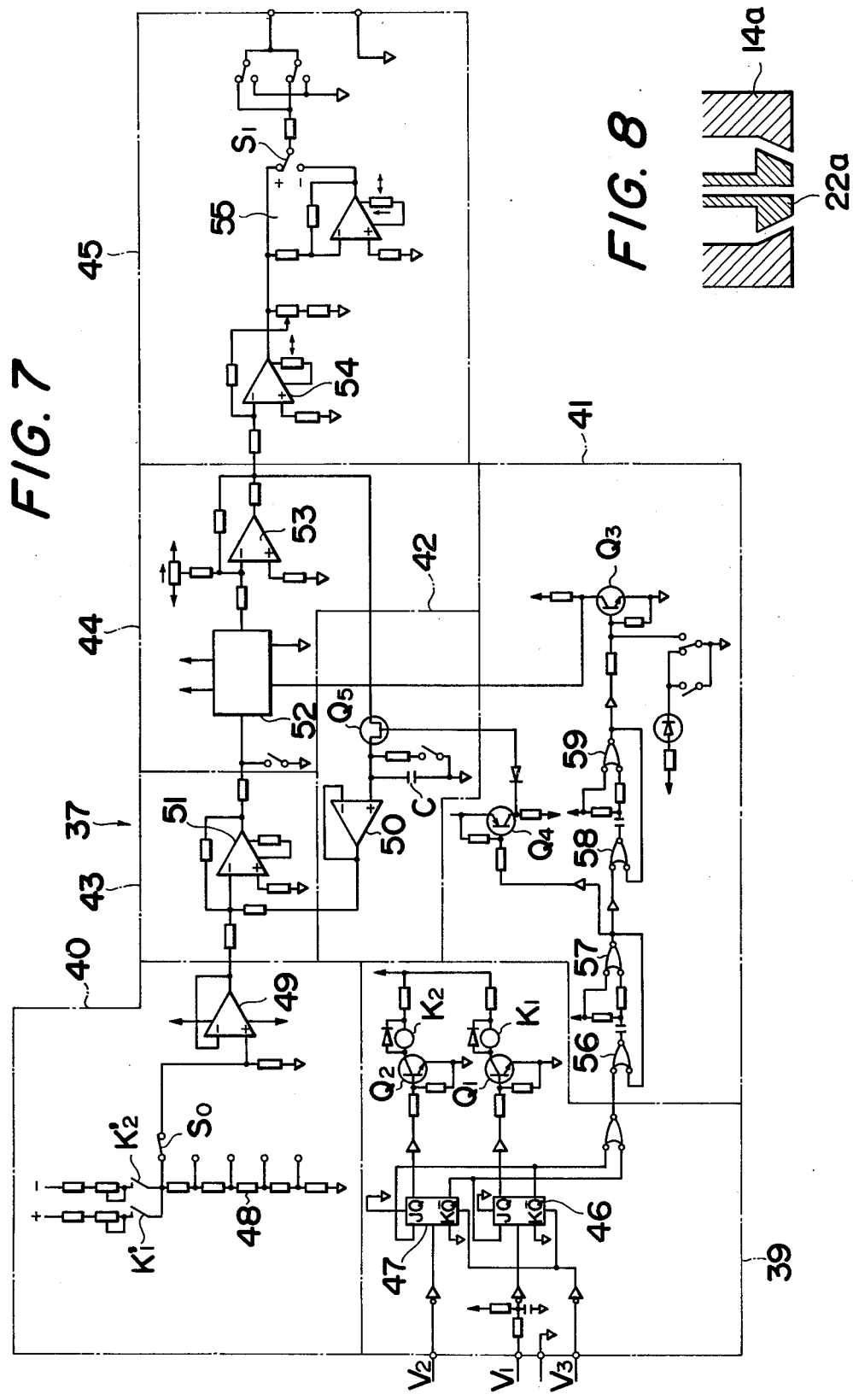

METHOD AND APPARATUS FOR CONTROLLING PARISON DIMENSIONS

BACKGROUND OF THE INVENTION

The present invention relates to generally a parison molding machine and more particularly a parison length controller therefore for automatically controlling the wall thickness of a parison being molded, thereby maintaining it to a predetermined length.

The parison molding machine or the extrusion-blowing machine vertically extrudes semi-molten plastic material through the die orifice between a circular die and a mandrel into a mold in the form of a hollow cylinder, thereby forming a parison.

The wall thickness of a parison is dependent upon the degree of opening of the die orifice which in turn is dependent upon the position of the mandrel with respect to the die. That is, depending upon the configurations of the dies used, a parison controller controls the degree of opening of the die orifice. As disclosed in U.S. Pat. No. 4,011,493, granted Mar. 8, 1977 to Hisahiko Fukase and Minoru Yoneda who are also the inventors of the present invention, the parison controller automatically moves the mandrel vertically depending upon the configurations of the die used so as to control the degree of opening of the die orifice, thereby controlling the wall thickness distribution of the parison which is being extruded.

Since a predetermined quantity of plastic material is extruded in every extrusion cycle, parisons having a predetermined length are formed as far as the uniform wall thickness distribution is maintained. However in practice the length of parisons varies because of the variations in temperature, density and viscosity of plastic material and in configuration of the dies used. So far the parisons having a length in excess of a predetermined length have been cut to a predetermined length, but those short of a predetermined length have been rejected so that the parison production efficiency is low and a considerably large amount of materials is wasted for nothing.

SUMMARY OF THE INVENTION

In view of the above, the present invention has for its object to provide a parison length controller for use with a plastic extrusion-blowing machine or a parison molding machine for automatically molding parisons having a predetermined length and a uniform wall thickness distribution.

Briefly stated, to this end the present invention provides a parison length controller for use with a plastic extrusion-blowing machine or a parison molding machine of the type including a parison controller wherein electric control means sequentially selects the output signals so programmed in a pinboard as to control a parison wall thickness and in response to the selected signal a servoamplifier controls a mandrel cylinder, said parison length controller comprising a comparator or detector for detecting which of the parison lower edge signal generated by a parison lower edge detector disposed below a mandrel for detecting the lower edge of a parison extruded to a predetermined length and the extrusion end signal generated by the control means every time when one parison is extruded occurs first; a reference voltage generator responsive to the output from said comparator or detector for generating a positive or negative voltage signal of a predetermined magnitude; an adder for adding or accumulating said positive or negative voltage signals each generated every time when one parison is extruded; and a memory for storing the sum or output voltage signal from said adder for a predetermined time period, whereby the contents in said memory may be transmitted as a parison wall thickness correction signal to said servoamplifier.

Therefore when a parison is to be extruded in excess of a predetermined length, the lower edge of the parison is detected by the parison lower edge detector prior to the generation of the extrusion end signal. That is, the parison lower edge signal occurs prior to the extrusion end signal. On the other hand when a parison is to be extruded short of a predetermined length, the extrusion end signal occurs prior to the generation of the parison lower edge signal. The comparator or detector detects whether the parison lower edge signal or the extrusion end signal occurs first and causes the reference voltage generator to generate a positive or negative voltage signal. For instance, when a parison is to be extruded in excess of a predetermined length, the parison lower edge signal occurs prior to the generation of the extrusion end signal so that the comparator or detector causes the reference voltage generator to generate a positive voltage of a predetermined magnitude. This positive voltage is transmitted through an adder and a memory to the servoamplifier as a wall thickness correction voltage signal. In response to this signal the servoamplifier controls the mandrel cylinder in such a way that the die orifice may be increased by a predetermined degree. As a result a parison to be molded in the following step or cycle has an increased wall thickness which is uniform over the whole length. Since the wall thickness is increased, the length of the parison is reduced accordingly.

When the parison thus molded is still in excess of a predetermined length, a positive voltage signal is generated in response to the detection of the lower edge of the parison in the manner described above and is added to the positive voltage signal generated in the preceding cycle. The sum voltage signal is transmitted to the servoamplifier so that the die orifice is further increased. This procedure is repeated as long as a parison is in excess of a predetermined length so that the thickness of parisons molded is progressively increased while the length is progressively reduced.

When this procedure is repeated several times, a parison short of a predetermined length is molded. Then the extrusion end signal occurs faster than the parison lower edge signal so that the comparator or detector causes the reference voltage generator to generate a negative voltage signal of a predetermined magnitude. This negative voltage signal is added to the accumulated positive voltage signal (the sum of the positive voltage signals each generated after one molding cycle has been completed) so that the correction signal to be applied to the servoamplifier is decreased in magnitude. Consequently the die orifice is reduced so that the wall thickness of a parison to be extruded in the following cycle is reduced while the length is increased. Since the positive or negative wall thickness correction procedure is repeated in the manner described above, the length of parisons extruded may be maintained substantially at or very close to a predetermined length.

The present invention will become more apparent from the following description of one preferred embodiment thereof taken in conjunction with the accompanying drawings.

BRIEF DESCRIPTION OF THE DRAWINGS

FIG. 7 is a circuit diagram of the parison length controller; and

FIG. 8 shows a mandrel different in construction from that shown in FIGS. 1 and 4.

DESCRIPTION OF THE PREFERRED EMBODIMENT

Figure 1:
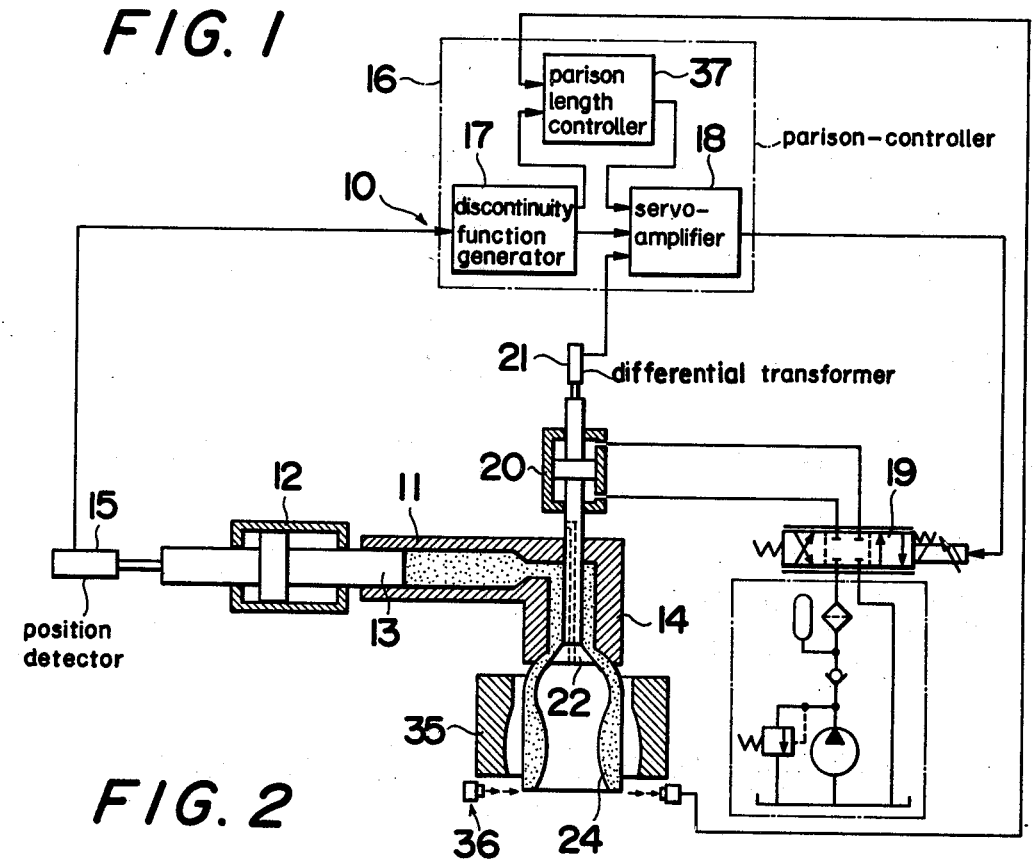
FIG. 1 is a diagrammatic view of a plastic extrusion-blowing machine or a parison molding machine incorporating a parison length controller in accordance with the present invention.

In FIG. 1 there diametrically is shown a variable orifice type extrusion-blowing or parison molding machine 10 incorporating the present invention. With this molding machine, a predetermined quantity of plastic material is charged into a cylinder 11, heated and extruded into a circular die 14 by an extrusion piston or plunger 13 operated by a cylinder 12. A position sensor 15 always senses the position of the piston or plunger 13; that is, the stroke thereof. In this embodiment, the position detector 15 generates an analog positional signal voltage representative of the position or stroke of the piston or plunger 13 and is for instance a potentiometer directly connected to the piston or plunger 13.

The signal voltage from the position detector 15 is applied to a discontinuity function generator 17 in a parison controller 16 so that the function generator 17 generates a parison wall-thickness signal according to the program stored in a pinboard. The thickness signal is transmitted through a servoamplifier 18 to a servovalve 19 which in turn operates a mandrel cylinder 20. A differential transformer 21 always senses the operation of the mandrel cylinder 20 so that a signal representative of the position of a mandrel 22 is fed back to an input of the servoamplifier 18.

The mandrel cylinder 20 operates to control the position of the mandrel 22 with respect to the die 14 and hence the orifice defined therebetween, thereby controlling the wall thickness of a parison 24 extruded therethrough. That is, the wall thickness of the parison 24 is determined by the parison wall thickness programmed in the pinboard in the function generator 17 and derived in response to the extrusion stroke of the piston or plunger 13.

Figure 2:
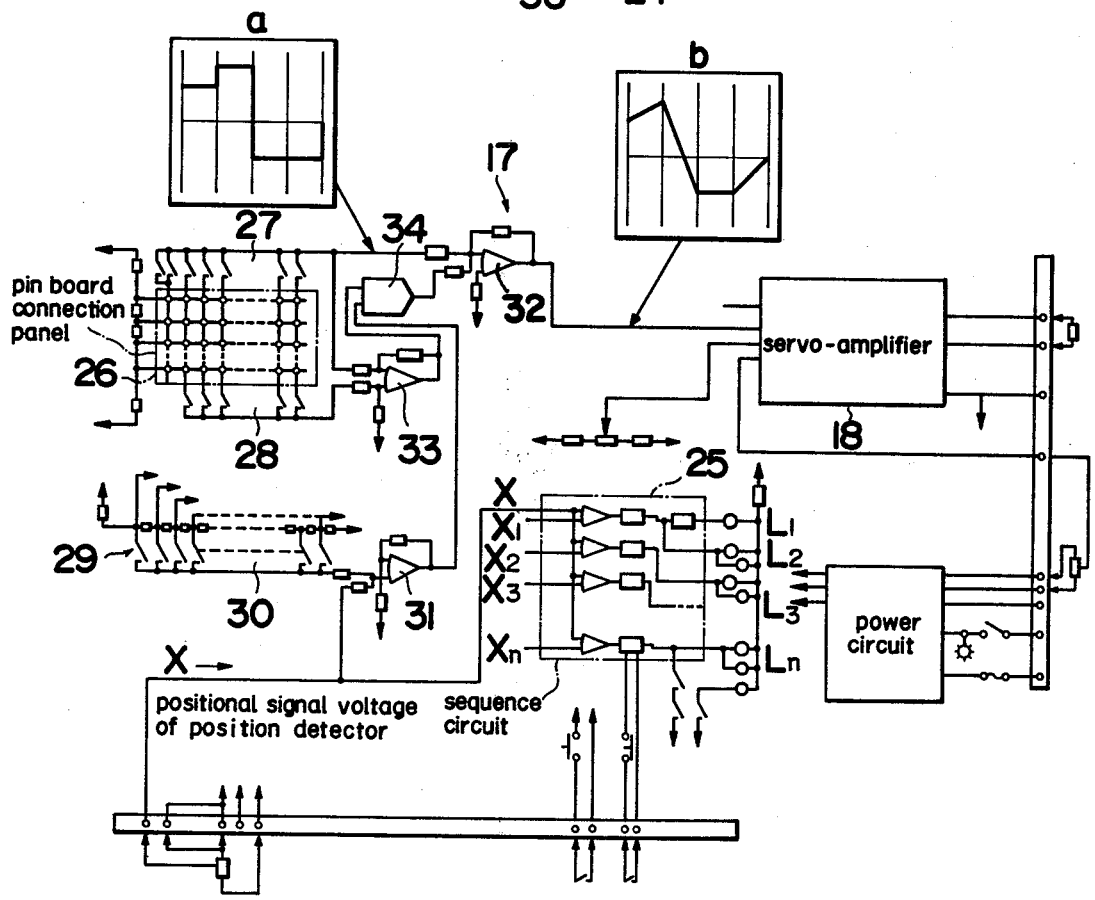
FIG. 2 is a circuit diagram of a discontinuity function generator of the parison molding machine.

In FIG. 2 there is shown a block diagram of the discontunuity function generator 17 including a sequence circuit 25. The positional signal voltage X representative of the position or the extrusion stroke of the piston or plunger 13 from the position detector 15 is applied to the sequence circuit 25 so that relays L1, L2, L3, . . . , and Ln connected to the outputs of the sequence circuit 25 are sequentially energized and de-energized for controlling a first bank of switches 27 and a second bank of switches 28 of the pinboard 26 and a third bank of switches 30 at the outputs of a level or reference signal voltage generator 29. The output indicated by a of the pinboard 26 is transmitted to the servoamplifier 18 through an arithmetic and logic circuit consisting of adders 31 and 32, a subtractor 33 and a multiplier 34 so that the input signal shown at b is applied to the servoamplifier 18. The discontinuity function generator 17 is disclosed in detail in U.S. Pat. No. 4,011,493, granted Mar. 8, 1977 to Hisahiko Fukase and Minoru Yoneda, who are also the inventors of the present invention, so that no further description shall be made in this specification.

Figure 3:
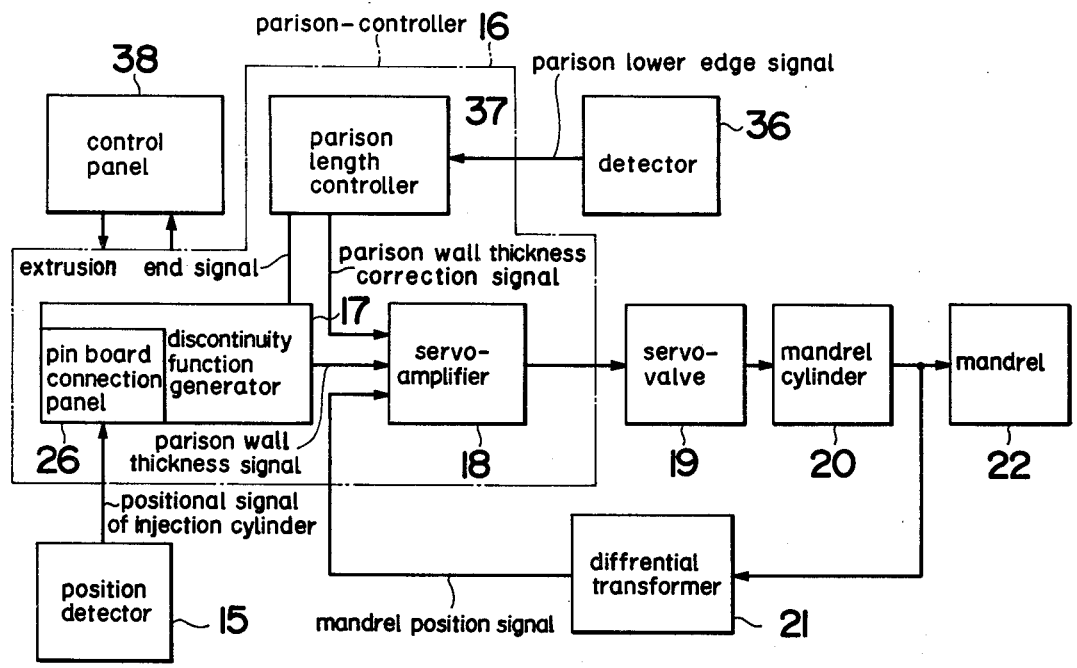
FIG. 3 is a block diagram of the parison molding machine.

Referring back to FIG. 1 and further referring to FIG. 3, the parison 24 is extruded vertically through the orifice 23 into a die 35, and the lower edge of the parison 24 emerging from the die 35 is sensed by a parison lower edge detector 36 spaced apart from the lower edge of the die 35 by such a distance that the lower edge of the parison extruded to a predetermined length may be detected. When the lower edge detector 36 detects the lower edge of the parison 24, it generates the signal (to be referred as "the parison lower edge signal" in this specification) which in turn is applied to a parison length controller 37 in the parison controller 16. Also applied to the parison length controller 37 is the signal which is generated by the position detector 15 when the piston or plunger 13 reaches the end of the extrusion stroke. (This signal will be referred to as the "extrusion end" signal in this specification.) The parison length controller 37 is so constructed and arranged as to detect which of the parison lower edge signal and the extrusion end signal arrives first and to generate a positive or negative voltage of a predetermined magnitude depending upon the parison lower edge signal or the extrusion end signal which has arrived prior to another as will be described in more detail hereinafter.

The positive or negative voltage signals each of which is generated after each extrusion step are sequentially added and stored in the parison length controller 37. Thus accumulated and stored voltage signal is applied to the servoamplifier 18 as a wall-thickness correction voltage signal whenever a parison is extruded. Therefore in response to the output from the servoamplifier 18 the servovalue 19 and the mandrel cylinder 20 are so operated as to adjust the position of the mandrel 22 and hence the degree of opening of the die orifice 23. As a result the length of the parison 24 is corrected while the wall thickness of the parison 24 may remain uniform over the whole length thereof. The parison controller 16 is controlled by a control panel 38 of the extrusion-blowing machine 10 as will be described in detail hereinafter.

The parison lower edge detector 36 is of a photoelectric type in this embodiment comprising a light emitting means 36a and a light reception means or photoelectric transducer 36b so arranged as to intercept the light beam emanating from the light emitting means 36a. Therefore when the lower edge of the parison 24 interrupts the light beam, the photoelectric transducer generates the parison lower edge signal $V_1$.

The light emitting means 36a and the photoelectric transducer 36b are so positioned that the light beam from the former to the latter may be at right angles to the axis of the parison 24 being extruded vertically downwardly and that the distance between this light beam and the lower edge of the orifice 23 may equal to a predetermined length of the parison 24. Instead of the photoelectric detector 36, and electromagnetic detector may be used. Furthermore a limit switch may be so positioned in the path of the parison as to be actuated by its passage. In this case, an actuating lever of the limit switch must be made of a heat-resisting material.

As described above, the discontinuity function generator 17 generates the extrusion end signal $V_2$. For instance, this signal may be a voltage impressed across the relay Ln of the sequence circuit 25 at the end of the extrusion of the parison 24. Alternately a limit switch may be mounted in the passage of the piston or plunger 12 in such a way that it may be actuated when the extrusion piston or plunger 12 reaches the end of the extrusion stroke.

Figure 4:
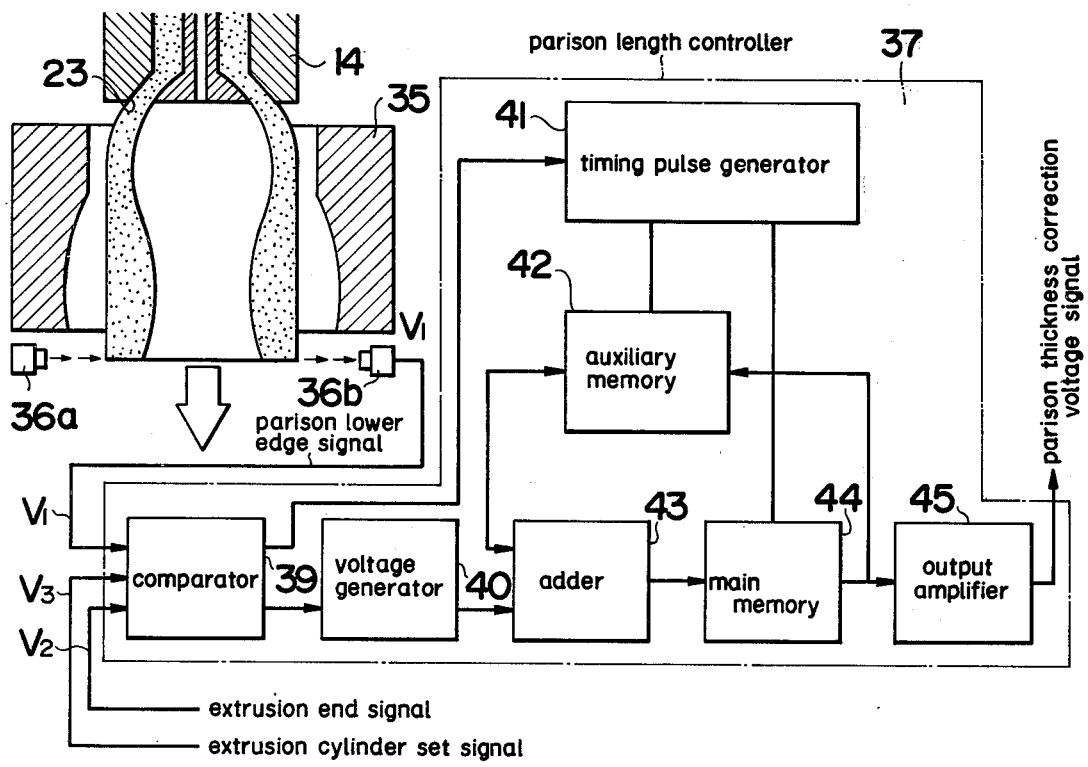
FIG. 4 is a block diagram of the parison length controller.

Referring particularly to FIG. 4, both the parison lower edge signal $V_1$ and the extrusion end signal $V_2$ are applied as inputs to a comparator or detector 39 in the parison length controller 37 which detects which of these signals $V_1$ and $V_2$ arrives first and which causes a reference voltage generator 40 to generate a positive or negative reference voltage while transmitting a clock signal to a timing pulse generator 41. The output from the comparator or detector 39 lasts until it receives an extrusion cylinder set signal which is for instance generated when the relay $L_1$ of the sequence circuit 25 in the discontinuity function generator 17 is energized. The comparator or detector 39 is so constructed and arranged that it may be responsive only to the first arrived signal $V_1$ or $V_2$ but not responsive at all to the second arrived signal $V_2$ or $V_1$.

In response to the output from the comparator or detector 39 the reference voltage generator 40 generates a positive or negative reference signal voltage of a predetermined magnitude which may be manually adjustable.

An adder 43 adds the output from the reference voltage generator 40 and the output from an auxiliary memory 42, and the output from the adder 43 is applied to a main memory 44, the contents of which is transmitted as the parison wall thickness correction signal to the servoamplifier 18 through an output amplifier 45.

Prior to the transfer of the output from the adder 43 into the main memory 44, the contents of the main memory 44 is transferred into the auxiliary memory 42. The timing pulse generator 41 generates timed pulses needed by the adder 43 and the auxiliary and main memories 42 and 44 to perform their specific functions described above. The auxiliary and main memories 42 and 43 are so constructed and arranged that they are immune to further inputs when they are storing the information.

Next the mode of operation will be described. When the length of the extruded parison 24 is longer than a predetermined length, the parison lower edge signal $V_1$ reaches the comparator or detector 39 faster than the extrusion end signal $V_2$ so that the comparator or detector 39 causes the reference voltage generator 40 to genrate a positive voltage signal of a predetermined magnitude. The adder 43 adds this positive voltage signal to the voltage signal transferred from the auxiliary memory 42, and the output voltage signal from the adder 43 is transferred into the main memory 44. The contents in the main memory 44 is transferred through the output amplifier 45 to the servoamplifier 18 so as to control the bias voltage thereof. Therefore in response to the output from the servoamplifier 18 the servovalve 19 operates to cause the mandrel cylinder 20 to move the mandrel 22 downward, thereby increasing the degree of opening of the die orifice 23. As a result the average wall thickness or section thickness of the parison 24 is increased accordingly, and consequently the length of a parison to be extruded in the next extrusion cycle becomes shorter than the length of the parison extruded in the preceding cycle. If the length of the parison extruded and blown in the next cycle is still longer than a predetermined length, the die orifice 23 is further increased in the manner described above so that the parison to be extruded in the next cycle may be shorter in length. If the parison becomes shorter than a predetermined length after a number of correction cycles, the extrusion end signal $V_2$ reaches the comparator or detector 39 faster than the parison lower edge signal $V_1$ so that the reference voltage generator 40 generates a negative voltage signal of a predetermined magnitude. As a result in response to the output signal from the servoamplifier 18 the servovalve 19 so operates the mandrel cylinder 20 as to cause it to move the mandrel 22 upward, thereby reducing the die orifice 23. Therefore the length of the parison to be extruded in the next cycle becomes longer than the length of the parison extruded in the preceding cycle. Thus the length of the parison may be maintained substantially at or very close to the desired length.

When the reference voltage generator 40 generates a positive or negative voltage signal, the input of the auxiliary memory 42 is closed so that the contents in the main memory 44 may be transferred into the auxiliary memory 44, but the input of the main memory 44 is kept opened. Thereafter the adder 43 adds the positive or negative voltage signal from the reference voltage generator 40 to the contents transferred from the auxiliary memory 42, and the sum voltage signal or the output from the adder 43 is transferred into the main memory 41.

Figure 5:
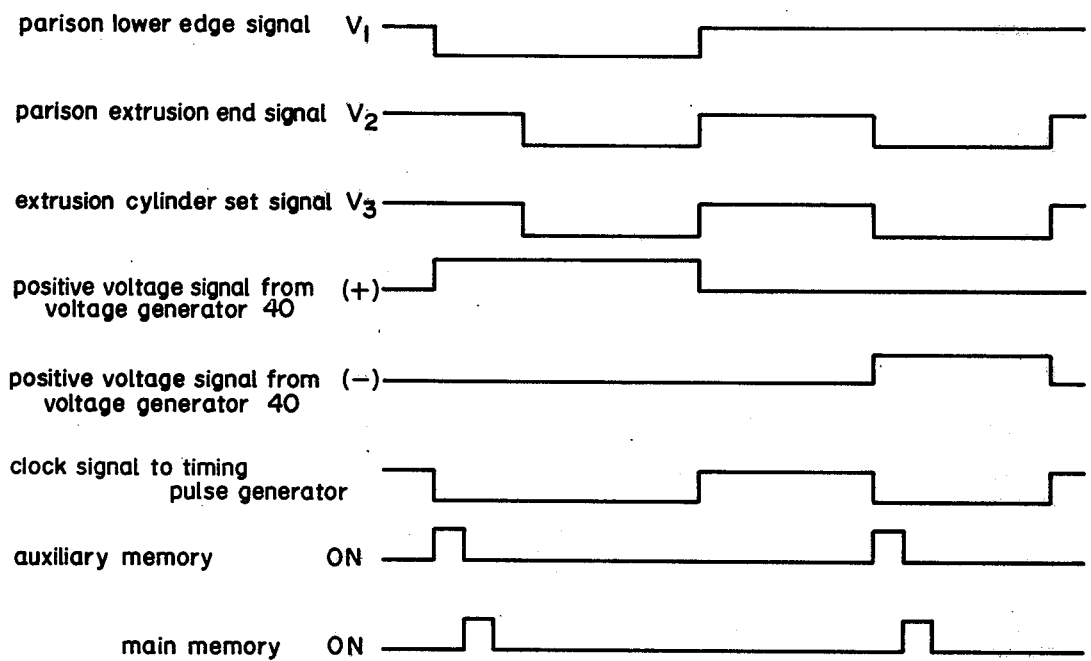
FIG. 5 is a timing chart used for the explanation of the mode of operation thereof.
Figure 6:
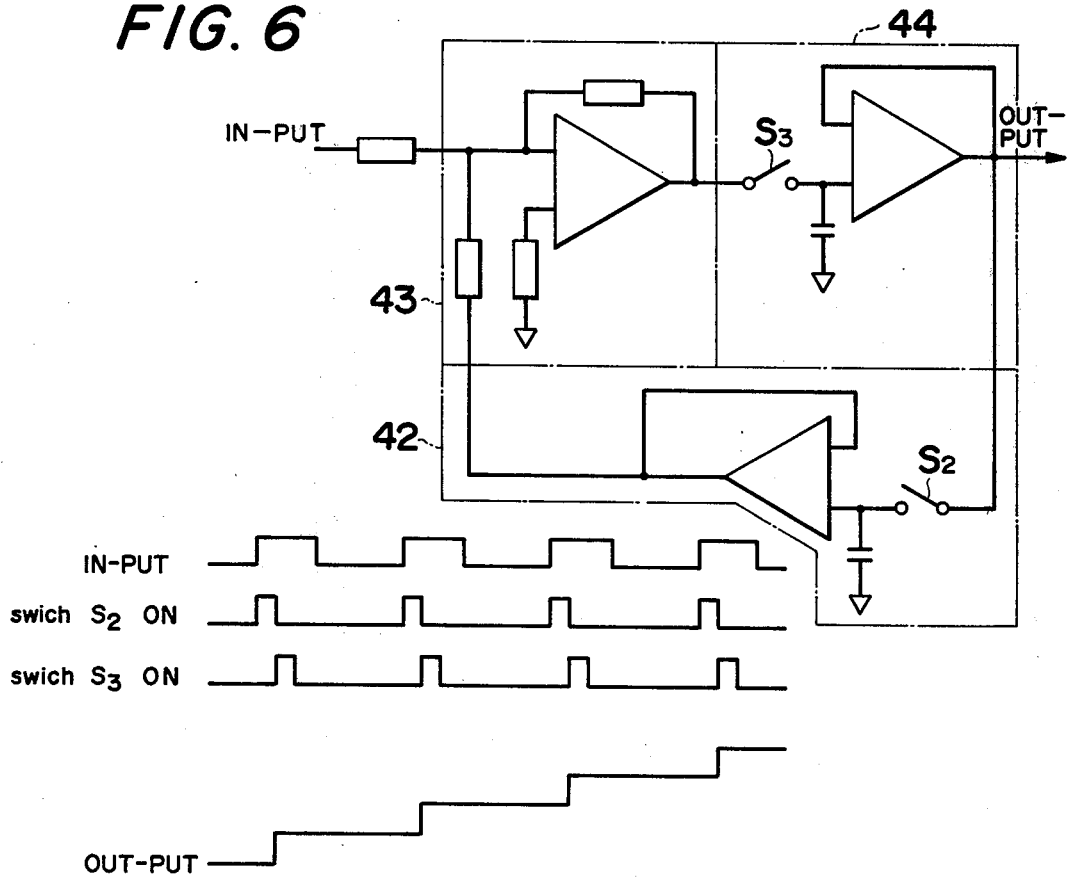
FIG. 6 shows an adder and auxiliary and main memories of the parison length controller and a timing diagram of signals associated with the adder and memories.

FIG. 5 is the timing diagram of those signals described above. The left half of FIG. 5 shows the signals when the parison lower edge signal $V_1$ arrives faster than the extrusion end signal $V_2$ while the right half shows the signals when the signal $V_2$ arrives faster than the signal $V_1$. FIG. 6 shows the circuit diagrams of the adder 42 and the auxiliary and main memories 43 and 44 and the timing chart of the associated signals. As described elsewhere the extrusion end signal $V_2$ occurs simultaneously when the extrusion cylinder set signal $V_3$ occurs which is applied to the relay Ln of the sequence circuit 25 upon the completion of the extrusion stroke. This signal $V_3$ is also used to cause the piston or plunger 13 to retract and to feed the plastic material into the cylinder 11. The voltage applied across the relay L, of the sequence circuit 25 at the end of the return stroke of the plunger 12 is applied as the extrusion cylinder set signal $V_3$ to the comparator or detector 39 of the parison length controller 37 so that the parison lower edge signal $V_1$, the extrusion end signal $V_2$, the reference voltage from the reference voltage generator 40 and the clock signal to the timing pulse generator 41 may be reset.

Next referring to FIG. 7, the parison length controller 37 will be described in more detail hereinafter. The comparator or detector 39 comprises two J-K flip-flops 46 and 47, and the parison lower edge signal $V_1$ is applied to the clock input of the flip-flop 46 while the extrusion end signal $V_2$, to the clock input of the flip-flop 47. The Q terminal of the flip-flop 46 is connected to the J input of the flip-flop 47 while the Q terminal of the flip-flop 47 is connected to the J input of the flip-flop 46. The K terminals of both the flip-flops 46 and 47 are grounded. Therefore when the parison lower edge signal $V_1$ arrives at the clock input of the flip-flop 46, its Q terminal becomes high so that a transistor $Q_1$ is enabled to energize a relay $K_1$ thereby closing a switch $K'_1$ operatively connected to the relay $K_1$ so that the reference voltage generator 40 selects a positive voltage of predetermined magnitude. On the other hand when the parison extrusion end signal $V_2$ arrives at the flip-flop 47 faster than the parison lower edge signal $V_1$, the Q terminal of the flip-flop 47 becomes high so that a transistor $Q_2$ is enabled. As a result a relay $K_2$ is energized so that a switch $K'_2$ operatively coupled thereto is closed and consequently the reference voltage generator 40 selects a negative voltage of a predetermined magnitude. When the parison lower edge signal $V_1$ arrives faster than the extrusion end signal $V_2$, the Q terminal of of the flip-flop 46 remains at a low level so that the J-terminal of the flip-flop 47 is low. Therefore even when the extrusion end signal $V_2$ arrives, the flip-flop 47 remains in the same state. Only when the extrusion cylinder set signal $V_3$ is applied to the clear terminals of the flip-flops 46 and 47, they are reset.

The reference voltage generator 40 is provided with a plurality of resistors connected in series so that the magnitude of the reference voltage signal may be varied manually as described elsewhere. The polarity of the reference voltage signal is selected depending upon whether the switch $K'_1$ or $K'_2$ is closed as described above, and after the magnitude of the reference voltage has been adjusted to a suitable level by an increment switch So, the reference voltage signal is applied through a buffer amplifier 49 to the adder 43. The adder 43 includes an operational amplifier or adder means 51 which adds the voltage signal from the buffer amplifier 49 and the contents of the auxiliary memory 42 which is applied through a buffer amplifier 50 to the operational amplifier 51, and the sum voltage signal is transferred into a memory unit 52 in the main memory 44. The contents in the main memory 44 is transferred through a buffer amplifier 53 to the output amplifier 45 consisting of a level fine-adjustment device 54 and a polarity selecting device 55. The output from the output amplifier 45 is transmitted as the parison wall thickness correction signal to the servoamplifier 18 as described elsewhere.

The auxiliary memory 42 comprises a field-effect transistor $Q_5$, a capacitor C and the buffer amplifier 50. The field-effect transistor $Q_5$ constitutes an analog switch. That is, when the filed-effect transistor $Q_2$ is enabled for a period of 20 milliseconds, the contents in the main memory 44 is transferred onto the capacitor C. After the field-effect transistor $Q_5$ has been disabled, the change in contents or the output of the main memory 44 will not affect the contents in the auxiliary memory 42 so that the addition of the output voltage signal from the voltage generator 40 and the contents in the auxiliary momory 42 is not adversely affected.

The timing pulse generator 41 comprises four AND gates 56, 57, 58 and 59 and two transistors $Q_3$ and $Q_4$, one input of the first AND gate 56 being connected to the Q terminals of the flip-flops 46 and 47 for receiving the clock pulse.

When a die 14a and a mandrel 22a of the type shown in FIG. 8 are used, the direction of the movement of the mandrel 22a must be reversed so that a switch $S_1$ is connected to the polarity selecting device 55 in the output amplifier 45 in order to reverse the polarity of the parison wall thickness correction signal.

As described above, according to the present invention the parisons having a predetermined length and a uniform wall or section thickness over the whole length may be molded so that a high yield may be ensured and the production efficiency may be considerably improved. Furthermore according to the present invention every time when the parison is molded, its lower edge is detected so that even when the plastic material changes in temperature and viscosity during the molding operation, the parisons having a predetermined length may be molded.

So far the present invention has been described in conjunction with the variable orifice type extrusion-blowing machine, but it is to be understood that the present invention may be equally applied to other plastic molding machines.

What is claimed is:

1. A method of controlling the wall thickness and thereby the length of parisons extruded in a blow molding machine during movement of a plunger to an end position relative to a die orifice the area of which is variable by a servoamplifier, comprising the steps of generating a first signal when the plunger reaches the end position thereof;

sensing the lower edge of a parison being extruded when the parison has reached a predetermined length and thereupon generating a second signal;

detecting said signals and generating an output in response thereto;

producing in response to said output, a voltage signal of predetermined magnitude and having a positive or negative polarity;

accumulating the positive and negative voltage signals;

storing the sum of the accumulated positive and negative voltage signals in a memory for a predetermined time period; and transmitting the contents of the memory to the servoamplifier as a wall thickness correction signal.

2. A method as defined in claim 1, wherein the steps of detecting comprises detecting which of first and second signals is first generated in time, and wherein the voltage signal produced has negative or positive polarity depending upon which of the first and second signals is first detected.

3. In a blow-molding machine wherein parisons of synthetic plastic material are extruded during the movement of a plunger to an end position relative to a die orifice the area of which is variable by a servoamplifier, a combination comprising means for generating a first signal when the plunger reaches said end position thereof;

means for sensing the lower edge of a parison being extruded when the parison has reached a predetermined length and for thereupon generating a second signal;

means for detecting which of said signals is generated first in time and for producing an output;

a reference voltage generator responsive to said output by producing a voltage signal of predetermined magnitude and having a positive or a negative polarity in dependence upon which of said first and second signals is first detected by said detecting means;

an adder for accumulating the positive and negative voltage signals which are generated during the extrusion of the respective parison;

a memory for storing the sum of the accumulated positive and negative voltage signals for a predetermined timed period; and means for transmitting the contents of said memory to said servoamplifier as a parison wall thickness correction signal.

4. A combination as defined in claim 3; and further comprising an additional memory into which the contents of the first mentioned memory are transferred in response to production of said voltage signal of predetermined magnitude, and wherein said adder adds said voltage signal to the contents in said additional memory, and the sum voltage signal is transmitted to said servoamplifier through said additional memory.

5. A combination as defined in claim 3, wherein said sensing means is of the photoelectric type.

6. A combination as defined in claim 3, wherein said sensing means is of the magnetoelectric type.

7. A combination as defined in claim 3, wherein said reference voltage generator comprises a plurality of series-connected resistors, and a selecting switch for driving a signal of a desired magnitude across a combination of said series-connected resistors.

8. A combination as defined in claim 3; and further comprising an output amplifier connected to the output of said memory so that the bias of said servoamplifier may be adjusted in response to the output from said output amplifier.

9. A combination as defined in claim 3, and said generating means comprising switch means operative for producing said first signal.

10. A combination as defined in claim 9, wherein said switch means comprises a limit switch.

11. In a blow-molding machine wherein parisons of synthetic plastic material are extruded during the movement of a plunger to an end position relative to a die orifice the area of which is variable by a servoamplifier, a combination comprising means for generating a first signal when the plunger reaches said end position thereof;

means for sensing the lower edge of a parison being extruded when the parison has reached a predetermined length and for thereupon generating a second signal;

means for detecting said signals and for producing an output;

a reference voltage generator responsive to said output by producing a voltage signal of predetermined magnitude and having a positive or a negative polarity;

an adder for accumulating the positive and negative voltage signals which are generated during the extrusion of the respective parison;

a memory for storing the sum of the accumulated positive and negative voltage signals for a predetermined time period; and means for transmitting the contents of said memory to said servoamplifier as a parison wall thickness correction signal.

* * * * *